United States Patent
Zhu et al.

(10) Patent No.: US 8,076,811 B2
(45) Date of Patent: Dec. 13, 2011

(54) FLUX-SWITCHING MAGNETIC MOTOR/GENERATOR MACHINE

(75) Inventors: Zi-Qiang Zhu, Sheffield (GB); Richard L. Owen, Sheffield (GB); Arwyn S. Thomas, Llanfyllin (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/461,650

(22) Filed: Aug. 19, 2009

(65) Prior Publication Data

US 2010/0072832 A1  Mar. 25, 2010

(30) Foreign Application Priority Data

Sep. 24, 2008 (GB) .................................. 0817423.7

(51) Int. Cl.
*H02K 23/04* (2006.01)
(52) U.S. Cl. ............... 310/154.11; 310/154.22; 310/181
(58) Field of Classification Search ........... 310/216.107, 310/49.36, 216, 254, 181, 154.01, 154.11, 310/154.22, 154.29
See application file for complete search history.

(56) References Cited

U.S. PATENT DOCUMENTS

| | | | | |
|---|---|---|---|---|
| 3,984,711 A | * | 10/1976 | Kordik | 310/49.46 |
| 5,095,237 A | * | 3/1992 | Bardas et al. | 310/90.5 |
| 5,327,069 A | * | 7/1994 | Radun et al. | 322/10 |

FOREIGN PATENT DOCUMENTS

| | | |
|---|---|---|
| GB | 1019506 | 2/1966 |
| GB | 2 100 936 A | 1/1983 |
| JP | A-2001-37176 | 2/2001 |
| WO | WO 01/73922 A2 | 10/2001 |

* cited by examiner

*Primary Examiner* — Quyen Leung
*Assistant Examiner* — Leda Pham
(74) *Attorney, Agent, or Firm* — Oliff & Berridge PLC

(57) ABSTRACT

A flux-switching magnetic machine is provided having a drive element and a driven element. The drive element is configured to generate a composite magnetic field comprising a fixed component and a variable component, the fixed component being generated by spaced fixed field members and the variable component being generated by spaced armature windings. The driven element has a plurality of magnetisable portions configured to be coupled to the composite magnetic field generated by the drive element, such that the driven element moves in response to changes in this field. The number of fixed field members is greater than the number of armature windings.

9 Claims, 2 Drawing Sheets

FLUX-SWITCHING MAGNETIC MOTOR/GENERATOR MACHINE

The present invention relates to flux-switching magnetic machines.

FIG. 1 shows a schematic plan view of a conventional flux-switching magnetic machine 10. The flux-switching magnetic machine is a brushless motor having a rotor 12 and a stator 14. The rotor 12 and the stator 14 each have respective teeth 16,18. The rotor 12 and the stator 14 have different numbers of teeth, and therefore for any lo orientation of the rotor relative to the stator, certain ones of the rotor teeth are offset relative to the closest stator teeth.

The stator teeth each comprise a permanent magnet 22 magnetised such that the magnetisation polarities of the magnets alternate circumferentially around the stator 14.

Armature windings 24 are wound around each of the stator teeth 18. Each armature winding 24 belongs to one of three sets, each set of armature windings having four armature windings 24 that are circumferentially-spaced at 90° intervals and that are configured to carry alternating current at the same phase. Armature windings 24 belonging to different sets carry alternating current at different phases.

As alternating current is passed through the three sets of armature windings, a variable magnetic field is generated that is superimposed over the fixed magnetic field resulting from the permanent magnets 22. The resultant combined magnetic field varies with time, causing the rotor 12 to rotate within the stator 14 as it attempts to bring the rotor teeth 16 to a position of minimum reluctance with respect to the stator teeth 18.

There is a continuing need to enhance the performance of flux-switching magnetic machines, in particular to increase their fault-tolerance.

In a first aspect, the present invention provides a flux-switching magnetic machine comprising a drive element and a driven element, the drive element being configured to generate a composite magnetic field comprising a fixed component and a variable component, the fixed component of the magnetic field being generated by a sequence of spaced fixed field members disposed on said drive element and the variable magnetic field being generated by a sequence of spaced armature windings disposed on said drive element, the driven element having a plurality of magnetisable portions configured to be coupled to the composite magnetic field generated by the drive element, such that the driven element moves in response to changes in the composite magnetic field generated by the drive element, wherein the number of fixed field members is greater than the number of armature windings.

Typically, the drive element is a stator and the driven element is a rotor, i.e. the machine may be a rotating machine. In general, the fixed field members and the armature windings are circumferentially spaced around the stator. However, the machine may also be a linear machine, e.g. having a linear drive element and a linear driven element.

In general, the fixed field members are magnets, typically permanent magnets, but in some cases they may be, e.g. direct current field windings. Typically, direct current field windings are wound around respective iron cores.

In the case that the fixed field members are permanent magnets, the flux-switching magnetic machine may also be referred to as a flux-switching permanent magnet machine.

Typically, the magnetisable portions of the driven element are teeth extending from the driven element. If the driven element is a rotor, the teeth will typically extend radially from the rotor. If the driven element is a linear driven element, the teeth will typically extend in a lateral direction of the driven element.

It has been shown that by providing a number of armature windings that is less than the number of fixed field members, nearest neighbour armature windings may be shielded from each other by an intervening fixed field member. Thus, the mutual inductance of nearest neighbour armature windings may be reduced significantly. For example, the mutual inductance of nearest neighbour armature windings may be reduced to 9% of the self-inductance of each winding, compared to a value of 40-50% for known flux-switching magnetic machines. This reduction in mutual inductance can increase the fault tolerance of the flux-switching magnetic machine.

By adjusting the number of turns of individual armature windings, the torque output of the flux-switching magnetic machine may be brought to the desired level.

Preferably, there are twice as many fixed field members as armature windings. In this case, the armature windings of each pair of nearest neighbour armature windings may be shielded from each other by an interposed fixed field member.

Typically, the fixed field members are uniformly spaced. In general, the armature windings are uniformly spaced.

Typically, each armature winding is centred on a fixed field member. For example, when the fixed field member is a magnet, the armature winding is generally wound around the magnet. The armature windings may be centred on alternate fixed field members.

Typically, the plurality of armature windings is configured to carry alternating electrical current of at least three phases. In general the flux-switching magnetic machine has enough windings to allow each phase to be carried by at least two windings.

However, the flux-switching magnetic machine may be configured to carry alternating electrical current of four, five, six or more phases. By increasing the number of phases carried by the flux-switching magnetic machine, the fault tolerance of the machine may be increased further, since there will typically be a lower reduction in rated output when a phase develops a fault. Similarly, the over-rating required per phase to maintain rated output during a fault condition may be reduced.

In addition, the higher number of phases may result in a smoother motion of the driven element of the machine. For example, in the case of a flux-switching magnetic machine in which the driven element is a rotor, the higher number of phases may result in reduced torque ripple of the machine, i.e. rotational motion of the rotor becomes smoother as the rotational displacement required for the magnetisable portions of the rotor to become aligned with the changing magnetic field is reduced.

The flux-switching magnetic machine of the first aspect of the invention may be used in a gas turbine engine, e.g. as the rotor stage of a low pressure compressor.

In a second aspect, the present invention provides a gas turbine engine having a flux-switching magnetic machine according to the first aspect of the invention, e.g. on the rotor stage of a low pressure compressor.

Embodiments of the invention will now be described by way of example with reference to the accompanying drawings in which.

Figure 2:
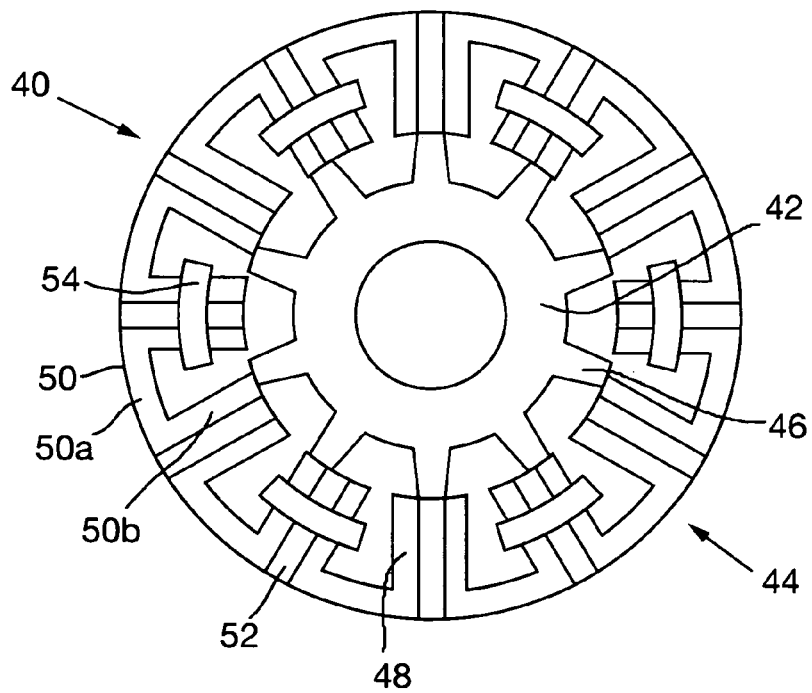
FIG. 2 shows a schematic plan view of an embodiment of a flux-switching magnetic machine according to the present invention.

FIG. 2 shows a plan view of a flux-switching magnetic machine 40 according to an embodiment of the present invention. The flux-switching magnetic machine has a stator (i.e. drive element) 44 and a rotor (i.e. driven element) 42. The rotor 42 and the stator 44 each have respective teeth 46,48. In the embodiment shown in FIG. 2, the rotor 42 has ten teeth 46, while the stator 44 has twelve teeth 48. However, other embodiments of flux-switching magnetic machines according to the present invention may have e.g. twelve stator teeth and thirteen rotor teeth, or twelve stator teeth and fourteen rotor teeth.

The teeth 46 of the rotor 42 are magnetisable portions of the rotor 42. The rotor 42 typically has an iron body. The body of the rotor 42 may be laminated.

The stator 44 has circumferentially-spaced C-shaped sections 50. The C-shaped sections each comprise a base 50a and arms 50b. The base 50a of each C-shaped section 50 lies on the perimeter of the stator 44, while the arms 50b extend in a radially inward direction of the stator 44. Each C-shaped section 50 may be laminated, and is typically formed of iron.

Permanent magnets (i.e. fixed field members) 52 are sandwiched between the arms 50b of nearest neighbour C-shaped sections 50. The permanent magnets 52 have an elongate shape and extend in a radial direction of the stator 44. Each stator tooth 48 comprises a permanent magnet 52 and one arm 50b from each of the C-shaped sections 50 adjacent to the permanent magnet 52.

The permanent magnets 52 are magnetised such that the polarity of their magnetisations alternates circumferentially around the stator 44.

Armature windings 54 are wound around alternate stator teeth only. Each armature winding 54 is wound about an axis that is aligned with the longitudinal axis of the permanent magnet 52 disposed in the respective stator tooth 48.

The plurality of armature windings 54 is grouped into three sets, each set of armature windings being configured to carry alternating electrical current at a different phase. Each set of armature windings has two armature windings 54 that are diametrically opposed across the stator 44 and that are configured to carry alternating current at the same phase. Armature windings 54 belonging to different sets carry alternating current at different phases.

As alternating current is passed through the three sets of armature windings, a variable magnetic field is generated that is superimposed over the fixed magnetic field resulting from the permanent magnets 52. The resultant composite magnetic field varies with time, causing the rotor 42 to rotate within the stator 44 as it attempts to bring the rotor teeth 46 to a position of minimum reluctance with respect to the stator teeth 48.

That is, the magnetisable portions, i.e. teeth 46, of the rotor 42 are configured to be coupled to the composite magnetic field generated by the stator 44, so that the rotor moves in response to changes in this magnetic field.

Figure 1:
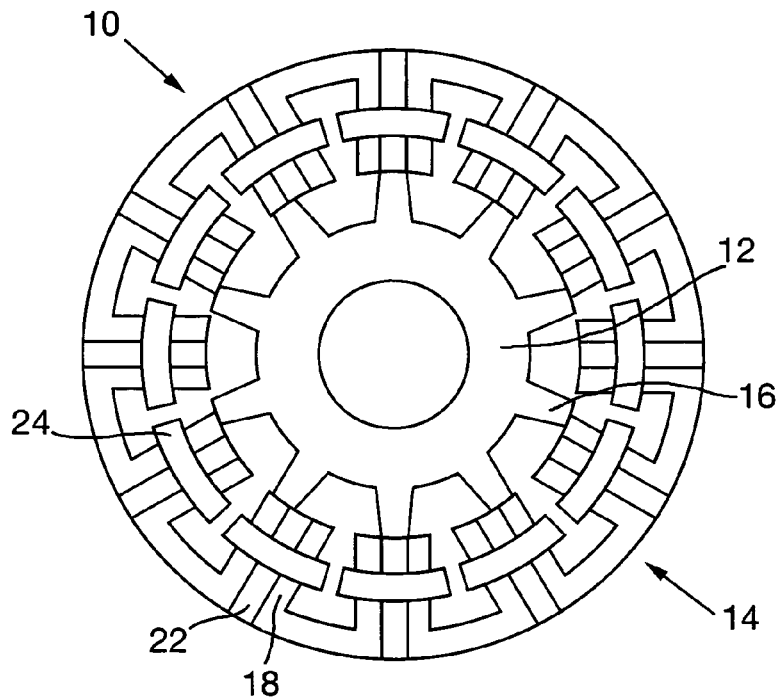
FIG. 1 shows a schematic plan view of a known flux-switching magnetic machine.

By providing armature windings 54 only on alternate stator teeth 48, nearest neighbour armature windings 54 are shielded from each other by the interposed stator tooth 48. Thus, the mutual inductance of nearest neighbour armature windings 54 is reduced relative to that observed in the known flux-switching magnetic machine shown in FIG. 1.

Figure 3:
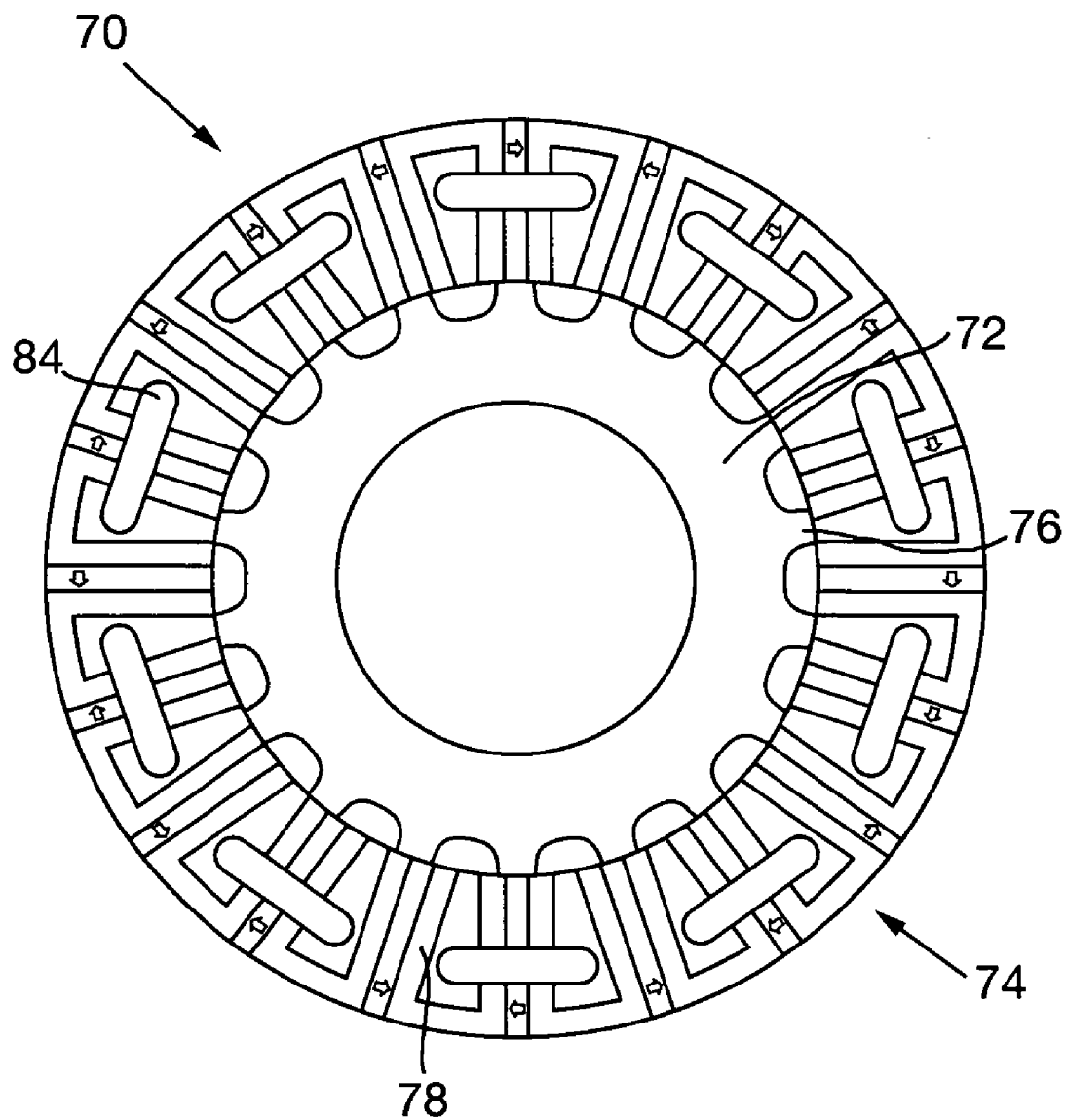
FIG. 3 shows a schematic plan view of another embodiment of a flux-switching magnetic machine according to the present invention.

FIG. 3 shows a plan view of a flux-switching magnetic machine according to another embodiment of the present invention. The flux-switching magnetic machine 70 of this embodiment has a similar configuration to the machine shown in FIG. 2, except that it has twenty stator teeth 78 and eighteen rotor teeth 76. Similarly to the flux-switching magnetic machine 40 shown in FIG. 2, the flux-switching magnetic machine 70 of FIG. 3 has armature windings 84 wound only around alternate stator teeth 78.

Each armature winding 84 belongs to one of five sets. Each set of armature windings has two armature windings 84 that are diametrically opposed across the stator 74 and that are configured to carry alternating current at the same phase. Armature windings 84 belonging to different sets carry alternating current at different phases.

By increasing the number of sets of armature windings 84 to five, it is possible to provide a flux-switching magnetic machine 70 having greater fault tolerance. That is, a greater percentage of the rated output may still be provided when one phase develops a fault. Similarly, the over-rating required per phase to maintain the rated output during a fault condition is reduced. By providing a greater number of sets of armature windings, and hence a greater number of phases, it is also possible to reduce the torque ripple of the flux-switching magnetic machine, since the rotational displacement required for realignment of the rotor 72 with the changing magnetic field is reduced.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A flux-switching magnetic motor/generator machine comprising:
    a stator being configured to generate a composite magnetic field,
    wherein the composite magnetic field includes:
        a fixed magnetic field component generated by a sequence of spaced fixed field members disposed on the stator, the fixed field members being permanent magnets, and
        a variable magnetic field component, generated by a sequence of spaced armature windings disposed on the stator, the number of armature windings being less than the number of fixed field members, wherein the armature windings are alternately disposed circumferentially around the stator such that armature windings are disposed on every other permanent magnet; and
    a rotor having a plurality of magnetisable portions,
    wherein the plurality of magnetisable portions are configured to be coupled to the composite magnetic field generated by the stator, such that the rotor moves in response to changes in the composite magnetic field generated by the stator.

2. A flux-switching magnetic motor/generator machine according to claim 1, wherein said fixed field members and said armature windings are each circumferentially spaced around said stator.

3. A flux-switching magnetic motor/generator machine according to claim 1, wherein each of said armature windings is centered on one of the fixed field members.

4. A flux-switching magnetic motor/generator machine according to claim 3, wherein the armature windings are centered on alternate fixed field members.

5. A flux-switching magnetic motor/generator machine according to claim 1, wherein said armature windings are configured to carry electrical current of at least three phases.

6. A gas turbine engine comprising a flux-switching magnetic motor/generator machine according to claim 1.

7. A flux-switching magnetic motor/generator machine according to claim 4, wherein the fixed field members have an elongate shape and extend in a radial direction of the stator.

8. A flux-switching magnetic motor/generator machine according to claim 7, wherein each of the armature windings surrounds only one fixed field member.

9. A flux-switching magnetic motor/generator machine according to claim 1, wherein the rotor is driven by the stator.

* * * * *